United States Patent [19]

Seiler et al.

[11] 4,029,720

[45] June 14, 1977

[54] BLOCK OR GRAFT COPOLYMERS OF POLYALKYLENE OXIDES AND VINYLAROMATIC OR DIENE POLYMERS

[75] Inventors: Erhard Seiler, Ludwigshafen; Gerhard Fahrbach, Schwetzingen; Dieter Stein, Limburgerhof, all of Germany

[73] Assignee: Badische Anilin- & Soda-Fabrik Aktiengesellschaft, Ludwigshafen (Rhine), Germany

[22] Filed: Mar. 3, 1975

[21] Appl. No.: 555,026

Related U.S. Application Data

[63] Continuation of Ser. No. 385,982, Aug. 6, 1973, abandoned.

[30] Foreign Application Priority Data

Aug. 10, 1972 Germany .......................... 2239401

[52] U.S. Cl. ................................ 260/887; 260/877; 260/888
[51] Int. Cl.² ...................... C08L 9/00; C08L 9/06
[58] Field of Search ............... 260/876 B, 887, 888, 260/877

[56] References Cited

UNITED STATES PATENTS

| 3,239,478 | 3/1966 | Harlan, Jr. ......................... 260/879 |
| 3,732,333 | 5/1973 | Mantell et al. .................... 260/887 |
| 3,786,116 | 7/1974 | Milkovich et al. ............. 260/876 R |

*Primary Examiner*—J. Ziegler
*Attorney, Agent, or Firm*—Keil, Thompson & Shurtleff

[57] ABSTRACT

A process for the manufacture of block or graft copolymers of polyalkylene oxides and vinylaromatic polymers or diene polymers. The block or graft copolymers are manufactured by reacting vinylaromatic polymers or diene polymers bearing methyl methacrylate end groups with polyalkylene oxides bearing alkali metal alcoholate end groups. The block or graft copolymers may be used as antistatic agents for plastics, as coating materials for non-woven webs, as intermediates in the manufacture of polyurethanes and as surfactants, protective colloids or emulsifiers.

11 Claims, No Drawings

BLOCK OR GRAFT COPOLYMERS OF POLYALKYLENE OXIDES AND VINYLAROMATIC OR DIENE POLYMERS

This is a continuation of application Ser. No. 385,982 filed Aug. 6, 1973, and now abandoned.

This invention relates to block or graft copolymers containing polyalkylene oxide blocks A and polyvinylaromatic blocks or diene polymer blocks B, and it further relates to a process for the manufacture of said block copolymers.

It is well known that diene hydrocarbons may be polymerized in non-polar solvents using organolithium initiators to form polydienes of low 1,2-vinyl content (cf. for example German Published Application No. 1,087,809).

It is also known that alkylene oxides may be polymerized in polar solvents using organometallic compounds of sodium or potassium.

Block copolymers of diene polymers and polyalkylene oxides may be simply made by polymerizing a diolefin with organometallic compounds of sodium or potassium in polar solvents followed by the addition of alkylene oxide. However, in such block copolymers the diene polymer block generally was 1,2-vinyl contents of from 65 to 80%. Thus the block copolymers have high glass temperatures and show only limited elastomeric characteristics.

When the attempt is made to add ethylene oxide to polybutadienyl lithium which has been prepared in non-polar solvents, only one ethylene oxide unit is added with chain termination without block copolymers being formed.

It is an object of the present invention to manufacture block copolymers of diene polymers and alkylene oxides, which block copolymers have a low 1,2-vinyl content in the diene polymer blocks and thus have a low glass temperature.

It is a further object of the invention to provide a general process for reacting polyalkylene oxide blocks having living chain ends with polyvinylaromatic blocks or diene polymer blocks.

Accordingly, the present invention relates to a process for the manufacture of block or graft copolymers of polyalkylene oxides and vinylaromatic polymers or diene polymers, in which a. vinylaromatic monomers and/or diene monomers are polymerized in a non-polar hydrocarbon solvent to form block B using an organolithium compound as initiator,
b. methyl methacrylate is added to the living chain ends of the polymer block B in amounts of from 0.5 to 10% by weight of said block B,
c. a polymer block A is concurrently made by homopolymerization of alkylene oxide or block copolymerization of alkylene oxide with vinylaromatic monomers and/or diene monomers using organosodium or organo-potassium compounds as initiators in preferably polar organic solvents and
d. block A is finally added to block B with the reaction of at least one living alkali metal alcoholate end group of block A with at least one ester group of block B with the elimination of alkali metal methoxide.

This process is particularly suitable for making block copolymers of the formula BA or BAB, where A is a polyalkylene oxide block and B is a diene polymer block, wherein less than 60% and preferably less than 15% of the diene units have 1,2-vinyl structure.

In the first stage of the process, a conventional polymerization of diene monomers or vinylaromatic monomers is carried out using organolithium catalysts. Suitable monomers are vinylaromatic compounds such as styrene or nuclear substituted or side-chain substituted styrenes, and diolefins such as butadiene and isoprene. The monomers may be polymerized alone or in admixture with each other. Alternatively, one monomer may be homopolymerized and a further monomer then added to the resulting living polymer.

The polymerization is carried out in non-polar hydrocarbon solvents, preferably aromatic hydrocarbons such as benzene, toluene and ethyl benzene. The monomers should be present in solution in a concentration of from 5 to 50% by weight of the total solution. With the exclusive use of non-polar solvents, the resulting diolefin blocks contain less than 15% of 1,2-vinyl units. By controlled addition of polar solvents such as ethers or amines in amounts of up to 10% by weight of the total solution it is possible to raise the content of 1,2-vinyl units up to 60%.

Suitable initiators are organolithium compounds, preferably n-, s- and t-butyllithiums. Basically, it is possible to use dilithium compounds such as dilithium naphthalene or dilithium stilbene, in which case blocks having two living chain ends are obtained. The initiators are used in amounts of from 0.0005 to 1 g of lithium per 100 g of monomer.

The polymerization may be carried out in the presence of conventional additives such as chain stoppers, e.g. 1,2-propadiene and 1,2-butadiene, and accelerators such as lithium alcoholates. Proton-active substances must be excluded. We prefer to carry out the polymerization under a blanket of inert gas such as nitrogen or argon, it being necessary to exclude oxygen. The polymerization temperature is generally between 0° and 120° C.

The molecular weight of block B may vary within wide limits ranging from 1,000 to 500,000. Preferably it is between 10,000 and 200,000.

In the second stage, methyl methacrylate is added to the living chain end or ends of block B in amounts of from 0.5 to 10% and preferably from 1 to 5% by weight of the block B. This polymerization is conveniently carried out in situ. Short polymethyl methacrylate chains are added to block B in this stage with the formation of ester end groups bearing a "living" $CH_2^-$ group. The reaction competing with the polymerization of the methyl methacrylate, namely the reaction of the ester group of the methyl methacrylate with the living chain end of block B with chain termination, may be ignored in most cases. It may be completely suppressed if small amounts of 1,1-diphenyl ethylene or α-methylstyrene are added, preferably in a molar ratio to the initiator of about 1:1. Another way of achieving this end is to add polar solvents or to lower the polymerization temperature. The addition polymerization of small amounts of methyl methacrylate produces no marked change in the properties and molecular weight of block B.

Concurrently with the preparation of block B, block A is made in a separate reaction vessel. Block A is a homopolymer or block copolymer of an alkylene oxide. Preferably polyethylene oxide or polypropylene oxide is used, and to achieve special effects it is possible to use block copolymers of the general formula AC or ACA, where A is a polyalkylene oxide block and C may be polystyrene, polybutadiene or a copolymer of butadiene and styrene. These blocks must exhibit at least one living chain end having an alkali metal alcoholate group. They may be made in known manner by homopolymerization or block copolymerization of alkylene oxides using organosodium or organopotassium initiators in preferably polar organic solvents. Preferred initiators are addition compounds of sodium and potassium with α-methylstyrene, napthalene, diphenyl, stilbene or other fused ring systems. The said initiators have a difunctional action and give blocks A having two living chain ends. Monofunctional initiators are for example potassium, phenyl potassium and benzyl potassium. The initiators are generally used in amounts of from 0.001 to 0.5% by weight. Particularly suitable solvents are ethers such as diethyl ether, anisol, tetrahydrofuran and dioxane. Alternatively and particularly when monofunctional initiators are being used, polymerization may be carried out in non-polar hydrocarbon solvents. The polymerization temperature is generally between −120° and +70° C and preferably between −80° and +60° C.

The method of producing block copolymers AC and ACA is described for example in U.S. Pat. No. 3,050,511 or German Patent Application No. 22,30,227. The molecular weight of block A is generally between 1,000 and 500,000 and preferably between 5,000 and 100,000.

The blocks A have at least one living alkali metal alcoholate end group. When block A reacts with block B, it is this alkali metal alcoholate group which reacts with at least one ester group of the methyl methacrylate end group of block B with the elimination of alkali metal methoxide. The combination of blocks A and B is conveniently effected by bringing the two solutions together, preferably at temperatures between −50° and +100° C. Blocks A and B may react with each other in a variety of ways: there may result two-blocks AB, three blocks BAB or ABA and also branched and crosslinked reaction products according to whether the blocks used have one or two living chain ends. Another possibility is that the living alkali metal alcoholate group of block A attacks more than one ester group of the methyl methacrylate grouping of block B. This is particularly likely to occur when the number of blocks A is larger than the number of blocks B during the reaction. In this way, there are produced graft copolymers in which a number of side chains A are attached by polymerization to a backbone chain B.

Following the reaction of the blocks, the living chain ends are conveniently stopped by adding proton-active substances such as organic acids, e.g. acetic acid. The block copolymers may be precipitated from solution with petroleum ether, where the alkylene oxide content is high, or with alcohol or water, where the alkylene oxide content is low. The block copolymer is then isolated by filtration or by distillation of the solvent.

The polymer block B has a hydrophobic character, whereas block A is hydrophilic. By varying the ratio of block A to block B it is possible to vary the combination of hydrophilic and hydrophobic properties in the block copolymers of the invention in a controlled manner. This gives rise to a variety of applications.

The block copolymers may be used as blending components for a number of plastics materials. If monomeric organic compounds are polymerized in the presence of the block copolymers containing diene polymers, grafting at the double bonds of the diene block may occur. In such polymer blends or graft polymers the hydrophilic polyalkylene oxide segments prevent static electrification. This advantage may be utilized, for example, when modifying styrene polymers in order to render them antistatic and also impact-resistant, in which case the antistatic agent is present as a polymeric component and thus cannot migrate or be extracted. Of particular advantage is the low glass temperature of the diene polymer blocks B having low 1,2-vinyl content, and such block copolymers are elastomeric within a wide temperature range.

After chain termination, the block copolymers have hydroxy groups at the chain ends. These enable polycondensation reactions to be carried out with difunctional reactants so as to form polyurethanes for example.

Due to their high water absorptive capacity, the block copolymers are suitable for use as coating materials for non-woven fabrics. They may also be used as adhesive primers in bonding procedures or they may be used for blending with plastics to make the latter compatible with each other. The combination of hydrophilic and hydrophobic properties makes them suitable for use as surfactants, protective colloids and emulsifiers.

The invention is further illustrated by the following Examples.

EXAMPLE 1 a. 1,500 ml of toluene distilled over butyl lithium, 30 ml of a 0.15M solution of butyl lithium in hexane and 325 g of butadiene distilled over butyl lithium are mixed together. The butadiene is polymerized at from 50° to 60° C, a 10% conversion being achieved after about 2—3 hours. The molecular weight of the resulting block B is found to be 95,000 by viscosity methods. The resulting polybutadiene contains 11.1% of units of 1,2-vinyl structure.

b. To this solution there are added 1 ml of 1,1-diphenyl ethylene and 10 ml of methyl methacrylate at room temperature.

c. In a separate polymerization vessel, 1,500 ml of tetrahydrofuran distilled over α-methylstyrene dipotassium, 30 ml of a 0.5M solution of tetrameric α-methylstyrene dipotassium in tetrahydrofuran and 355 g. of ethylene oxide distilled over butyl lithium are mixed together. Ethylene oxide is polymerized at from 30° to 40° C, a 100% conversion being achieved after approximately 4–5 hours. The molecular weight of the resulting block A is found to be 36,000 by viscosity methods.

d. The contents of the two reaction vessels are combined and the mixture is stirred for about 4 hours at room temperature.

The mean molecular weight of the resulting block copolymer is found to be 175,000. It contains polyethylene oxide as block A and polybutadiene as block B.

EXAMPLE 2 a. A mixture is formed from 1,500 ml of toluene, 182 g of styrene, 325 g of butadiene and 30 ml of a 0.15M solution of butyl lithium. Polymerization produces a polymer block B having a molecular weight of about 145,000.

b. To this solution there are added 1 ml of 1,1-diphenyl ethylene and 20 of methyl methacrylate at room temperature.

c. In a separate vessel there are mixed 1,500 ml of tetrahydrofuran, 440 g of ethylene oxide and 20 of a 0.5M solution of tetrameric α-methylstyrene dipotassium. Polymerization gives a polymer block A having an average molecular weight of 85,000.

d. The contents of the two vessels are combined. The resulting block copolymer has an average molecular weight of 205,000. It contains polymer blocks A of polyethylene oxide and polymer blocks B themselves consisting of a polystyrene block and a polybutadiene block showing gradual transitions between the blocks.

EXAMPLE 3 a. In a first vessel there are mixed 1,500 ml of toluene, 455 g of styrene and 20 ml of a 0.15M solution of butyl lithium. Polymerization gives a polymer block B having an average molecular weight of 170,000.

b. To this solution there are added 1 ml of 1,1-diphenyl ethylene and 20 ml of methyl methacrylate.

c. In a second vessel there are mixed 2,500 ml of tetrahydrofuran, 750 g of ethylene oxide and 35 ml of a 0.5M solution of tetrameric α-methylstyrene dipotassium. Polymerization gives a polymer block A having an average molecular weight of 80,000.

d. The two solutions are combined, and the block copolymer resulting from the reaction has an average molecular weight of 295,000. It contains polymer blocks A of polyethylene oxide and polymer blocks B of polystyrene.

EXAMPLE 4 a. 1,500 ml of toluene distilled over butyl lithium, 30 ml of a 0.5M solution of butyl lithium in hexane and 325 g of butadiene distilled over butyl lithium are mixed and reacted at 60° C. The molecular weight of the resulting polybutadiene (block B) is found to be 105,000.

b. To this "living" solution of polymer there are added 5 ml of α-methylstyrene and 20 ml of methyl methacrylate at 0° C.

c. In a separate polymerization vessel there are mixed 1,500 ml of toluene (distilled over butyl lithium) and 20 ml of an approx. 0.3M suspension of cumyl potassium in heptane. With vigorous stirring there are added 150 g of styrene at 40° C, polymerization being effected with 100% conversion after 1 hour. A small portion of the solution is removed for analysis purposes and the molecular weight is found to be 35,000.

To this living solution of polystyrene there are added 300 ml of ethylene oxide distilled over butyl lithium and polymerization is continued to completion at from 40° to 50° C within a few hours. The molecular weight is found to be about 95,000. There is formed a two-block polymer AC of polyethylene oxide and polystyrene containing 66.5% by weight of ethylene oxide.

d. The contents of the two vessels are combined and stirred for 2 hours at 50° C. The resulting block copolymer of butadiene, styrene and ethylene oxide has an average molecular weight of 185,000.

We claim:

1. A process for the manufacture of block copolymers of polyalkylene oxides which comprises:
   1. forming a polymer block A by homopolymerizing an alkylene oxide selected from the group consisting of ethylene oxide and propylene oxide or block copolymerizing at least one of said alkylene oxides with at least one monomer selected from the group consisting of styrene, butadiene and isoprene to form alternating polymeric blocks within said block A using organosodium or organopotassium compounds as initiators in polar organic solvents;
   2. forming a polymer block B by the steps of
      a. polymerizing at least one monomer selected from the group consisting of butadiene, isoprene and styrene in a non-polar hydrocarbon solvent using an organolithium compound as initiator, wherein less than 60% of the diene units in said polymer block B have a 1,2-vinyl structure, and
      b. adding methyl methacrylate to the living chain ends of the polymer block B in amounts of from 0.5 to 10% by weight of methyl methacrylate based on the weight of block B, whereby short polymethyl methacrylate claims are formed having ester end groups bearing a living $CH_2$ group; and
   3. forming the final block copolymer by adding polymer block A to polymer block B with the reaction of at least one living alkali metal alcoholate end group of block A with at least one ester group of block B with the elimination of alkali metal methoxide.

2. A process as set forth in claim 1 wherein said block B is prepared from butadiene.

3. A process as set forth in claim 1 wherein said alkylene oxide is ethylene oxide.

4. A process as set forth in claim 1 wherein said organo-lithium compound is selected from the group consisting of n-butyllithium, s-butyllithium, t-butyllithium, dilithium naphthalene and dilithium stilbene.

5. A process as set forth in claim 1 wherein said organo-sodium compound is selected from the group consisting of the addition compounds of sodium with α-methylstyrene, naphthalene, diphenyl and stilbene.

6. A process as set forth in claim 1 wherein said organo-potassium compound is selected from the group consisting of cumyl potassium, phenyl potassium, benzyl potassium and the addition compounds of potassium with α-methylstyrene, naphthalene, diphenyl and stilbene.

7. A process as set forth in claim 1 wherein block A is a homopolymer of ethylene oxide and block B is polybutadiene.

8. A process as set forth in claim 1 wherein block A is prepared in a polar solvent selected from the group consisting of diethyl ether, anisol, tetrahydrofuran and dioxane.

9. A process as set forth in claim 1 wherein block B has a 1,2-vinyl content of less than 15% of the diene units.

10. A process as set forth in claim 1 wherein the amount of methyl methacrylate is from 1 to 5% by weight of block B.

11. A process as set forth in claim 1 wherein block B has a molecular weight of from about 1,000 to 500,000 and wherein the molecular weight of block A is from 1,000 to 500,000.

* * * * *

UNITED STATES PATENT AND TRADEMARK OFFICE
CERTIFICATE OF CORRECTION

PATENT NO. : 4,029,720
DATED : June 14, 1977
INVENTOR(S) : Erhard Seiler et al

It is certified that error appears in the above-identified patent and that said Letters Patent are hereby corrected as shown below:

[56] "3,786,116   7/1974   Milkovich et al   260/876 R"
     should read:
   --3,786,116   1/1974   Milkovich et al   260/876 R--

Signed and Sealed this

Eleventh Day of April 1978

[SEAL]

Attest:

RUTH C. MASON
Attesting Officer

LUTRELLE F. PARKER
Acting Commissioner of Patents and Trademarks